US006659902B1

(12) United States Patent
Ehrlinger

(10) Patent No.: US 6,659,902 B1
(45) Date of Patent: Dec. 9, 2003

(54) GEARBOX

(75) Inventor: Friedrich J. Ehrlinger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 9 days.

(21) Appl. No.: 10/088,881

(22) PCT Filed: Oct. 11, 2000

(86) PCT No.: PCT/EP00/09989

§ 371 (c)(1),
(2), (4) Date: Mar. 21, 2002

(87) PCT Pub. No.: WO01/29452

PCT Pub. Date: Apr. 26, 2001

(30) Foreign Application Priority Data

Oct. 15, 1999 (DE) .......................................... 199 49 856

(51) Int. Cl.⁷ ............................. F16H 3/44; F16H 37/02
(52) U.S. Cl. ..................... 475/269; 475/214; 475/219; 475/296; 475/302; 475/311; 192/3.52; 192/3.54
(58) Field of Search ............................ 475/296, 311, 475/313, 207, 219, 269, 270, 214, 293, 302; 192/3.52, 3.54, 219, 220

(56) References Cited

U.S. PATENT DOCUMENTS

| 3,937,313 A | | 2/1976 | Abbott ..................... 192/48.91 |
| 3,945,452 A | * | 3/1976 | Klaue ....................... 180/24.09 |
| 3,979,973 A | | 9/1976 | Klaue ......................... 74/740 |
| 3,982,618 A | * | 9/1976 | Horsch ................... 192/113.35 |
| 4,523,493 A | * | 6/1985 | Wei.beta. ..................... 475/205 |
| 4,726,245 A | * | 2/1988 | Klaue ........................ 74/336 R |
| 4,777,837 A | | 10/1988 | Lehle ......................... 74/360 |
| 4,976,666 A | * | 12/1990 | Meyerle ....................... 475/83 |
| 5,088,968 A | | 2/1992 | Horii et al. ................. 475/124 |
| 5,836,849 A | | 11/1998 | Mathiak et al. ............. 475/269 |
| 6,024,667 A | * | 2/2000 | Krohm et al. .................. 477/6 |
| 6,244,402 B1 | * | 6/2001 | Domian et al. ............. 192/3.51 |
| 6,251,037 B1 | * | 6/2001 | Baumgaertner et al. ........ 475/2 |
| 6,488,138 B1 | * | 12/2002 | Baur et al. ............... 192/87.15 |

FOREIGN PATENT DOCUMENTS

| DE | 1 085 045 | 7/1960 | ........... B62D/10/01 |
| DE | 24 61 108 | 7/1975 | ............. F16H/3/46 |
| DE | 34 31 485 A1 | 3/1986 | ............. F16H/5/02 |
| DE | 36 19 329 A1 | 1/1987 | ........... F16H/37/06 |
| DE | 195 46 707 A1 | 6/1997 | ............. B60K/17/00 |
| EP | 0 145 041 A1 | 6/1985 | ............. B60K/41/08 |
| EP | 0 094 464 B1 | 4/1986 | ........... F16H/37/04 |
| GB | 2195721 A | * 4/1988 | ........... F16H/37/04 |

* cited by examiner

Primary Examiner—Tisha D Lewis
(74) Attorney, Agent, or Firm—Davis & Bujold, PLLC

(57) ABSTRACT

A multi-gear, manual transmission, especially for utility vehicles, with at least partially automatized gear shifting or with a manual gear shift, in which the gear synchronization is carried out by motor guidance and wherein the transmission possesses a forward shift-group, a main-shift-group and a post shift-group, whereby the pre-shift-group is designed as a planetary gear set (2P) and a support member of the planetary gear set is constructed as a friction brake, which is active in the slow gear-shift position and thereby assumes the function of a start-up clutch.

19 Claims, 1 Drawing Sheet

GEARBOX

Figure 1:
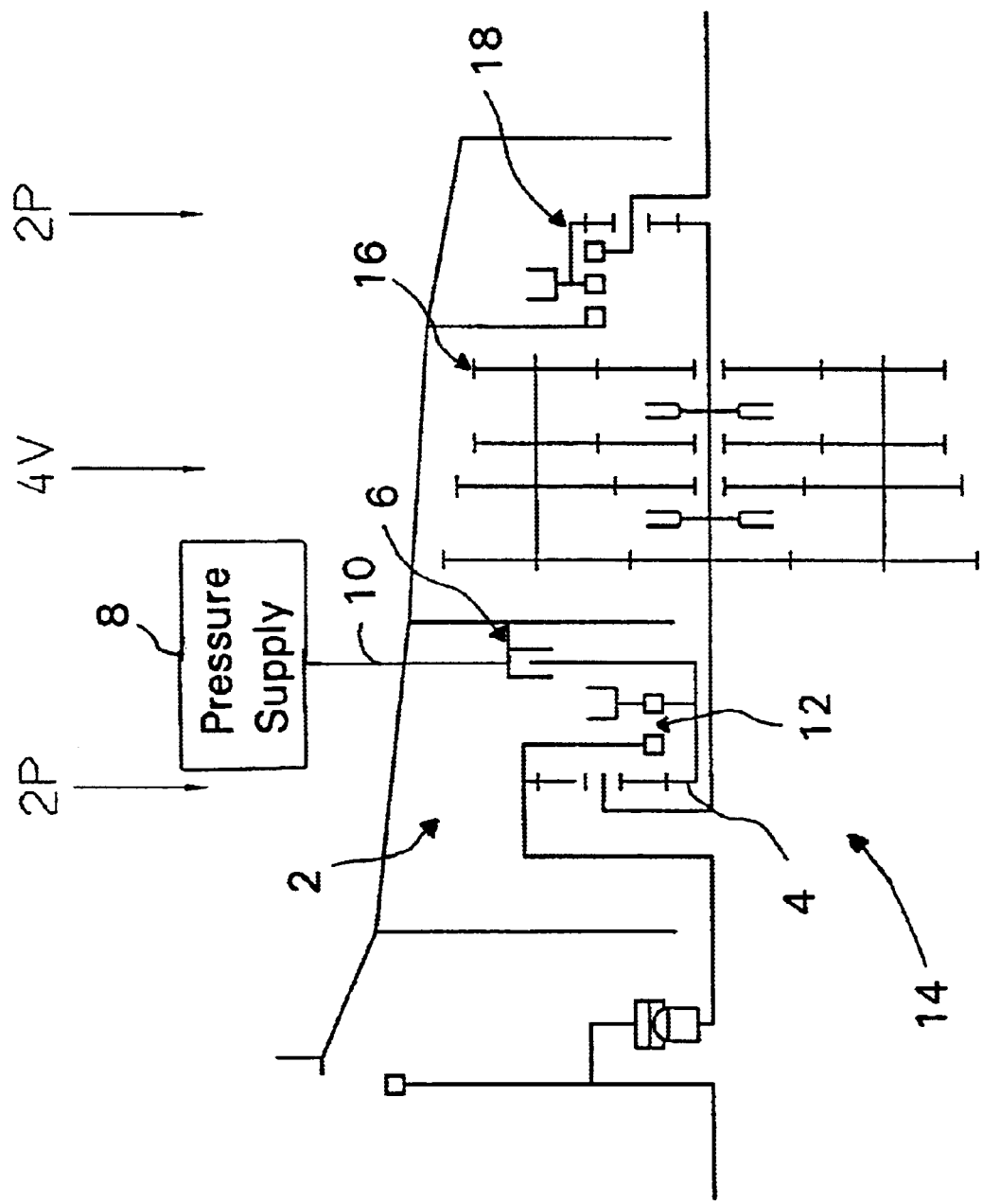

The present invention concerns a multi-gear, manual transmission, especially for utility vehicles, with at least partially automatized gear shifting or with manual gear shifting, in which the gear synchronization is carried out by motor guidance and which transmission possesses a forward shift-group, a main shift-group and a post shift-group.

A multi-gear transmission, comprising a main-transmission, an area-group transmission and a reversing gear train, has been made known by DE A 36 19 329 of the applicant. These transmissions transfer power from one input drive shaft to an output drive shaft through a plurality of gearshifts by means of gears, synchronous-shift clutches and shiftable friction clutches, whereby two power branches are provided and the power, in every case, is only transferred by one power-branch. In each power-branch, one friction clutch and at least one synchronous-shifting clutch act sequentially, one after the other, in the direction of power flow. The two friction clutches are placed on the input drive. Thereby, a first driving speed area is created with shifting steps of large increments, and a second driving speed is created with shifting steps of small increments, whereby in a limited total travel speed area, the drive motor can be employed at a higher speed of rotation and greater power, without having to eliminate a large total speed area.

In the case of this known transmission, as well as in all other shift transmissions in use today, driving clutches and the corresponding transmissions are two separate component groups. The driving clutch, in this arrangement, along with the flywheel and the transmission, is connected to the motor block. A rigid, that is a screwed connection, between the clutch and the transmission does not exist. If clutch and transmission, as has been often desired by manufacturers of vehicles, are to be furnished to make a system unit on a production line, then today, two loose parts, always separated one from the other are delivered. In this way, a careful tuning is needed between these two separate components since not only the torque, but also the inertia of the clutch plate, as well as the principal dimensions and the like must be precisely matched to one another.

To bring into actuality the cost lowering potentialities inherent in the reduction of complexities for the vehicle manufacturer by providing a combined system with a smaller mounting expense, it is obviously desirable, to connect these two individual parts to one another, that is, to integrate the clutch into the transmission.

On this account, the purpose of the present invention is to create a multi-gear shifting transmission, especially for utility vehicles, in which the driving clutch is integrated into the transmission.

Starting from a multi-gear shifting transmission of the kind described in the introductory passages, the achieving of the purpose of the invention will be accomplished with the features stated in the characterizing part of claim 1. Advantageous embodiments are described in the subordinate claims.

In accord with the invention, the proposal has also been made, that in the case of a multi-gear shifting transmission with at least a partially automatized transmission shift or with a manual-shift transmission, in which the gear synchronization is carried out under the guidance of the motor, and in which the manual shift transmission possesses at least two gear train groups, the forward shift-group is comprised of a planetary gear set and the support member of the planetary drive is designed as a friction brake, which acts in the slow shift position and on this account takes over the function of a start-up clutch.

Besides the already mentioned lowering of manufacturing costs and reduction of the complexity, this being done by the delivery of an integral system with a lowered time and expense for assembly, the advantage is achieved with the invented combined transmission, that a greater reliability of the shift-gear train is made possible, along with a better co-action of the two parts with one another, namely the clutch and the transmission.

At the same time, again an advantage is gained, in that, contrary to a conventional gear train, first, the clutch with its pressure plate, second the clutch plate with the torsion damper, third the release bearing and its cylinder can all be dispensed with. Besides the mentioned lowering of costs, this leads to a substantial decrease in the weight. The conventional forward shift-group in the form of a 2-shift reduction gear train, is replaced with a planetary gear set with constant mesh transmission.

The invented clutch integration is described in connection with a sixteen-shift transmission, designated as 2P×4V× 2P, wherein V stands for the leading gearing and P for the planetary gear set. Conventional sixteen-shift transmissions normally exhibit the assembly 2P×4V×2P.

By means of the invented formulation of the forward (splitter) shift-group 2 being served by the planetary group 2P, as can be inferred from FIG. 1, the possibility is created, to brake and secure the support member—that member being the sun gear 4 of the input side planetary gear set—with a friction clutch 6. This support member of the planetary gear set is designed thus in the slow or low shift position and takes on the function of the starting clutch. A friction brake is substantially more favorable in cost than is a conventional start-up clutch.

A further provision is made to allow the friction brake or clutch 6, which serves as the starting clutch, to be made engageable by compressed air being supplied from a pressure supply 8 via a pressure line 10 to the friction brake or clutch 6, wherein the brake is disengaged without pressure, and upon pressurizing, the friction brake or clutch 6 engages. Air pressure is already provided on board in every conventional utility vehicle for other purposes and thus entails no additional costs.

Provision is further made, that the input planetary gear set 2P can be by-passed by a shape-fitted or lockup clutch 12, so that thereby, it is possible to shift into a new or subsequent gear position.

The friction brake or clutch 6, which has assumed the function of the start-up clutch, can either be installed in a dry-sump of the transmission or, on the other hand, in the oil-lubricated wet-sump of the transmission (both only diagrammatically illustrated in FIG. 1).

It is emphasized, that in the entire remaining gear train, no further friction-closure separating member is part of the assembly.

The multi-gear manual transmission 14 possesses the forward (splitter) shift-group (2P) 2, the main shift-group (4V) 16 and a post shift-group (2P) 18.

What is claimed is:

1. A multi-gear manual transmission for a utility vehicle in which the gear synchronization is carried out by motor guidance and the multi-gear manual transmission possesses a forward shift-group, a main shift-group and a post shift-group, wherein the forward shift-group is a planetary gear set (2P) having a support member constructed as a friction brake, the friction brake functioning as a start-up clutch for the multi-gear manual transmission, also provided to the planetary gear set (2P) is a shape fit clutch which also by-passes said planetary gear set (2P).

2. The multi-gear manual transmission according to claim 1, wherein the friction brake is connected, via a pressures fluid line, to supply of fluid pressure whereby, upon pressurization of the friction brake, the friction brake is engaged so that the friction brake transmits driving torque to the main shift-group and, when the friction brake is unpressurized, the friction brake is disengaged and interrupts transmission of driving torque to the main shift-group.

3. The multi-gear manual transmission according to claim 2, wherein the supply of fluid pressure comprises compressed air which is supplied to the friction brake.

4. The multi-gear manual transmission according to claim 1, wherein the friction brake is in a dry sump brake.

5. The multi-gear manual transmission according to claim 1, wherein the friction brake is in a wet sump brake.

6. The multi-gear manual transmission according to claim 1, wherein the post shift-group is a planetary gear set (2P).

7. A multi-gear manual transmission for a utility vehicle in which the gear synchronization is carried out by motor guidance and the multi-gear manual transmission possesses a forward shift-group, a main shift-group and a post shift-group, wherein the forward shift-group is a planetary gear set (2P) having a support member constructed as a friction brake, the friction brake functioning as a start-up clutch for the multi-gear manual transmission, and the friction brake of the forward shift-group planetary gear set (2P) is the only frictional engageable separating member of the manual transmission.

8. The multi-gear manual transmission according to claim 7, wherein the friction brake is connected, via a pressure fluid line, to supply of fluid pressure whereby, upon pressurization of the friction brake, the friction brake is engaged so that the friction brake transmits driving torque to the main shift-group and, when the friction brake is unpressurized, the friction brake is disengaged and interrupts transmission of driving torque to the main shift-group.

9. The multi-gear manual transmission according to claim 8, wherein the supply of fluid pressure comprises compressed air which is supplied to the friction brake.

10. The multi-gear manual transmission according to claim 7, wherein the friction brake is in a dry sump brake.

11. The multi-gear manual transmission according to claim 7, wherein the friction brake is in a wet sump brake.

12. The multi-gear manual transmission according to claim 7, wherein the post shift-group is a planetary gear set (2P).

13. A multi-gear manual transmission for a utility vehicle in which gear synchronization is carried out by motor guidance, the multi-gear manual transmission having:

a splitter group;

a main shift-group; and a range group;

wherein the splitter group is a planetary gear set (2P) having one component thereof constructed as a friction brake, and the friction brake, in a low gear-shift position, functions as a start-up clutch for the multi-gear manual transmission to transmit driving torque from the splitter group planetary gear set (2P') to the main shift-group; and the friction brake of the splitter group is the only frictional engageable separating member of the multi-gear manual transmission.

14. The multi-gear manual transmission according to claim 13, wherein the friction brake is connected, via a pressure fluid line to supply fluid pressure whereby, upon pressurization of the friction brake, the friction brake is engaged so that the friction brake transmits driving torque to the main shift-group and, when the friction brake is unpressurized, the friction brake is disengaged and interrupts transmission of driving torque to the main shift-group.

15. The multi-gear manual transmission according to claim 13, wherein the supply of fluid pressure comprises compressed air which is supplied to the friction brake.

16. The multi-gear manual transmission according to claim 13, wherein the fiction brake is in a dry sump brake.

17. The multi-gear manual transmission according to claim 13, wherein the friction brake is in a wet sump brake.

18. The multi-gear manual transmission according to claim 13, wherein the splitter group has a lockup clutch which, when engaged, passes the driving torque to the main shift-group.

19. The multi-gear manual transmission according to claim 13, wherein the range group is a planetary gear set (2P).

* * * * *